(12) United States Patent
McAuliffe et al.

(10) Patent No.: US 11,230,948 B2
(45) Date of Patent: Jan. 25, 2022

(54) WORK RECOVERY SYSTEM FOR A GAS TURBINE ENGINE UTILIZING AN OVEREXPANDED, RECUPERATED SUPERCRITICAL CO2 BOTTOMING CYCLE

(71) Applicant: United Technologies Corporation, Farmington, CT (US)

(72) Inventors: Brendan T. McAuliffe, West Hartford, CT (US); Joseph B. Staubach, Colchester, CT (US); Nagendra Somanath, South Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 266 days.

(21) Appl. No.: 16/248,884

(22) Filed: Jan. 16, 2019

(65) Prior Publication Data

US 2020/0224589 A1    Jul. 16, 2020

(51) Int. Cl.
*F01K 25/10*    (2006.01)
*F02C 6/18*    (2006.01)
*F01K 23/10*    (2006.01)
*F02K 3/06*    (2006.01)

(52) U.S. Cl.
CPC ............ *F01K 25/103* (2013.01); *F01K 23/10* (2013.01); *F02C 6/18* (2013.01); *F02K 3/06* (2013.01); *F05D 2220/62* (2013.01); *F05D 2260/213* (2013.01)

(58) Field of Classification Search
CPC .......... F01K 25/103; F01K 23/10; F02C 6/18; F02C 1/10; F02K 3/06; F05D 2220/62; F05D 2260/213

USPC ................. 60/39.181, 39.183, 650, 682–684
See application file for complete search history.

(56) References Cited

U.S. PATENT DOCUMENTS

| | | | | |
|---|---|---|---|---|
| 3,971,211 A | * | 7/1976 | Wethe ....................... | F01K 7/32 60/39.181 |
| 4,067,189 A | * | 1/1978 | Earnest .................... | F01K 23/10 60/39.182 |
| 4,178,754 A | * | 12/1979 | Earnest ................... | F01K 23/10 60/39.181 |
| 4,765,143 A | * | 8/1988 | Crawford .................. | F01K 3/00 60/651 |

(Continued)

OTHER PUBLICATIONS

Kim, Min Seok et al., Study on the supercritical CO2 power cycles for landfill gas firing gas turbine bottoming cycle, Energy, Elsevier, Amsterdam, NL, vol. 111, Jun. 17, 2016 (Jun. 17, 2016), pp. 893-909, XP029721633, ISSN: 0360-5442.

(Continued)

*Primary Examiner* — Hoang M Nguyen
(74) *Attorney, Agent, or Firm* — Carlson, Gaskey & Olds, P.C.

(57) ABSTRACT

A gas turbine engine includes a primary flowpath fluidly connecting a compressor section, a combustor section, and a turbine section. A heat exchanger is disposed in the primary flowpath downstream of the turbine section. The heat exchanger includes a first inlet for receiving fluid from the primary flowpath and a first outlet for expelling fluid received at the first inlet. The heat exchanger further includes a second inlet fluidly connected to a supercharged CO2 (sCO2) bottoming cycle and a second outlet connected to the sCO2 bottoming cycle. The sCO2 bottoming cycle is an overexpanded, recuperated Brayton cycle.

22 Claims, 2 Drawing Sheets

(56) References Cited

U.S. PATENT DOCUMENTS

| | | | |
|---|---|---|---|
| 9,032,734 B2* | 5/2015 | Davidson | G05F 1/66 |
| | | | 60/647 |
| 9,745,899 B2 | 8/2017 | Wright et al. | |
| 9,885,283 B2 | 2/2018 | Vaisman et al. | |
| 9,982,629 B2 | 5/2018 | Armstrong et al. | |
| 10,072,574 B2 | 9/2018 | Stapp | |
| 2013/0133327 A1* | 5/2013 | Milam | F01K 23/04 |
| | | | 60/651 |
| 2013/0145759 A1* | 6/2013 | Sonwane | F22B 35/086 |
| | | | 60/526 |
| 2013/0269334 A1 | 10/2013 | Sonwane et al. | |
| 2014/0150443 A1* | 6/2014 | Laing | F01K 23/103 |
| | | | 60/774 |
| 2016/0010551 A1* | 1/2016 | Allam | F02C 7/143 |
| | | | 60/772 |
| 2016/0047361 A1* | 2/2016 | Al-Sulaiman | F01K 23/10 |
| | | | 60/641.15 |
| 2017/0082066 A1 | 3/2017 | Armstrong et al. | |
| 2017/0101931 A1 | 4/2017 | Armstrong et al. | |
| 2018/0313232 A1 | 11/2018 | Auciello et al. | |

OTHER PUBLICATIONS

Marchionni, Matteo et al., Techno-economic assessment of Joule-Brayton cycle architectures for heat to power conversion from high-grade heat sources using CO2 in the supercritical state, Energy, Elsevier, Amsterdam, NL, vol. 148, Feb. 4, 2018 (Feb. 4, 2018), pp. 1140-1152, XP085361812, ISSN: 0360-5442.

Ahn, Yoonhan et al., Review of supercritical CO2 power cycle technology and current status of research and development, Nuclear Engineering and Technology, vol. 47, No. 6, Oct. 1, 2015 (Oct. 1, 2015), pp. 647-661, XP055694583, KP, ISSN: 1738-5733.

European Search Report for Application No. 20152216.6 dated May 29, 2020.

* cited by examiner

WORK RECOVERY SYSTEM FOR A GAS TURBINE ENGINE UTILIZING AN OVEREXPANDED, RECUPERATED SUPERCRITICAL CO2 BOTTOMING CYCLE

TECHNICAL FIELD

The present disclosure relates generally to a system for recovering waste heat in a gas turbine engine, and more specifically to a work recovery system utilizing a supercritical CO2 cycle to recover work from excess heat.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section further drives the compressor section to rotate. In some examples, a fan is also connected to the shaft and is driven to rotate via rotation of the turbine as well.

The operation of the gas turbine engine generates excessive amounts of heat due to the combustion and expansion processes. Energy that has been converted into heat and is subsequently expelled from the gas powered turbine as exhaust without providing work is referred to as waste heat. Waste heat is one of the primary sources of loss (inefficiency) in any thermodynamic cycle, and minimization of waste heat in an engine therefore increases the efficiency of the engine.

SUMMARY OF THE INVENTION

In one exemplary embodiment a gas turbine engine includes a primary flowpath fluidly connecting a compressor section, a combustor section, and a turbine section, a heat exchanger disposed in the primary flowpath downstream of the turbine section, the heat exchanger including a first inlet for receiving fluid from the primary flowpath and a first outlet for expelling fluid received at the first inlet, the heat exchanger further including a second inlet fluidly connected to a supercharged CO2 (sCO2) bottoming cycle and a second outlet connected to the sCO2 bottoming cycle, and wherein the sCO2 bottoming cycle is an overexpanded, recuperated Brayton cycle.

In another example of the above described gas turbine engine the sCO2 bottoming cycle comprises a turbine having a working fluid turbine inlet connected to the second outlet of the heat exchanger and a spent working fluid turbine outlet connected to an overexpansion compressor inlet of an overexpansion compressor, the overexpansion compressor having an overexpansion compressor outlet connected to a working fluid compressor inlet of a working fluid compressor, the working fluid compressor further including a working fluid compressor outlet connected to the second inlet of the heat exchanger.

Another example of any of the above described gas turbine engines further includes a recuperator heat exchanger including a first flowpath connecting the working fluid compressor outlet to the second inlet of the heat exchanger.

In another example of any of the above described gas turbine engines the recuperator heat exchanger further includes a second flowpath connecting the working fluid turbine outlet to the overexpansion compressor inlet.

Another example of any of the above described gas turbine engines further includes a first heat rejection heat exchanger connecting an outlet of the overexpansion compressor to an inlet of the working fluid compressor.

In another example of any of the above described gas turbine engines the working fluid turbine outlet is connected to the overexpansion compressor inlet via a second heat rejection heat exchanger.

In another example of any of the above described gas turbine engines a fluid pressure at the working fluid compressor inlet is at least a supercritical pressure of a fluid in the working fluid bottoming cycle during standard operations, and wherein a pressure of the working fluid at the overexpansion compressor inlet is below a supercritical pressure of the working fluid at the inlet of the working fluid compressor.

In another example of any of the above described gas turbine engines during standard operations, a fluid pressure and temperature at the working fluid compressor inlet is at least a supercritical pressure and temperature of the working fluid in the sCO2 bottoming cycle.

In another example of any of the above described gas turbine engines the overexpanded, recuperated bottoming cycle includes a mechanical output, and wherein the mechanical output is configured to transmit rotational work from the overexpanded, recuperated bottoming cycle to at least one other engine system.

In another example of any of the above described gas turbine engines the sCO2 bottoming cycle contains a CO2 fluid and the CO2 fluid is maintained at at least a supercritical point throughout an entirety of the sCO2 cycle.

An exemplary method for recovering work from waste heat in a gas turbine engine includes heating a supercritical CO2 (sCO2) working fluid in a heat exchanger using a gas turbine engine exhaust, providing the heated sCO2 working fluid to a waste recovery turbine, expanding the heated sCO2 working fluid across the waste recovery turbine, thereby driving the waste recovery turbine to rotate, providing sCO2 working fluid from an outlet of the waste recovery turbine to an inlet of an overexpansion compressor and compressing the sCO2 working fluid, providing the sCO2 working fluid from an outlet of the overexpansion compressor to an inlet of a work recovery compressor through a first heat rejection heat exchanger, providing the compressed sCO2 working fluid to an inlet of the waste recovery turbine from the work recovery compressor, and maintaining the sCO2 working fluid above a supercritical point through an entirety of a working cycle.

Another example of the above described exemplary method for recovering work from waste heat in a gas turbine engine further includes passing the sCO2 working fluid from the outlet of the waste recovery turbine through a recuperator heat exchanger, and passing an sCO2 working fluid from the work recovery compressor through the recuperator heat exchanger prior to providing the sCO2 working fluid from the work recovery compressor to the heat exchanger thereby transferring heat from the sCO2 working fluid exiting the turbine to the sCO2 working fluid entering the heat exchanger.

In another example of any of the above described exemplary methods for recovering work from waste heat in a gas turbine engine providing sCO2 working fluid from the outlet of the waste recovery turbine to the inlet of the overexpansion compressor comprises passing the sCO2 working fluid through a second heat rejection heat exchanger, thereby dumping waste heat to a heat sink.

In another example of any of the above described exemplary methods for recovering work from waste heat in a gas turbine engine the heat sink is at least one of fan duct air, ram air, fuel, and a transcritical CO2 refrigeration cycle.

In another example of any of the above described exemplary methods for recovering work from waste heat in a gas turbine engine providing sCO2 working fluid from the outlet of the waste recovery turbine to the inlet of the overexpansion compressor comprises reducing a temperature and pressure of the sCO2 working fluid to below a minimum supercritical temperature and pressure of the working fluid at the work recovery compressor inlet.

In another example of any of the above described exemplary methods for recovering work from waste heat in a gas turbine engine expanding the heated sCO2 working fluid across the waste recovery turbine, thereby driving the waste recovery turbine to rotate further comprises transmitting rotational work from the waste recovery turbine to at least one engine system in the gas turbine engine.

In another example of any of the above described exemplary methods for recovering work from waste heat in a gas turbine engine the heat exchanger is disposed in a primary flowpath of a gas turbine engine and is aft of a turbine section of the gas turbine engine.

In another example of any of the above described exemplary methods for recovering work from waste heat in a gas turbine engine compressing the sCO2 working fluid comprises driving rotation of the work recovery compressor via the waste recover turbine.

In one exemplary embodiment a gas turbine engine includes a primary flowpath fluidly connecting a compressor section, a combustor section, and a turbine section, a heat exchanger disposed in the primary flowpath downstream of the turbine section, the heat exchanger including a first inlet for receiving fluid from the primary flowpath and a first outlet for expelling fluid received at the first inlet, the heat exchanger further including a second inlet fluidly connected to a supercharged CO2 (sCO2) bottoming cycle and a second outlet connected to the sCO2 bottoming cycle, wherein the sCO2 bottoming cycle is an overexpanded, recuperated Brayton cycle, and a means for transmitting rotational work from the overexpanded recuperated bottoming cycle to at least one other engine system.

In another example of the above described gas turbine engine the means for transmitting rotational work includes a mechanical output connected to at least one of a drive shaft, a gear system, and an electrical generator and distribution system.

These and other features of the present invention can be best understood from the following specification and drawings, the following of which is a brief description.

DETAILED DESCRIPTION

Figure 1:
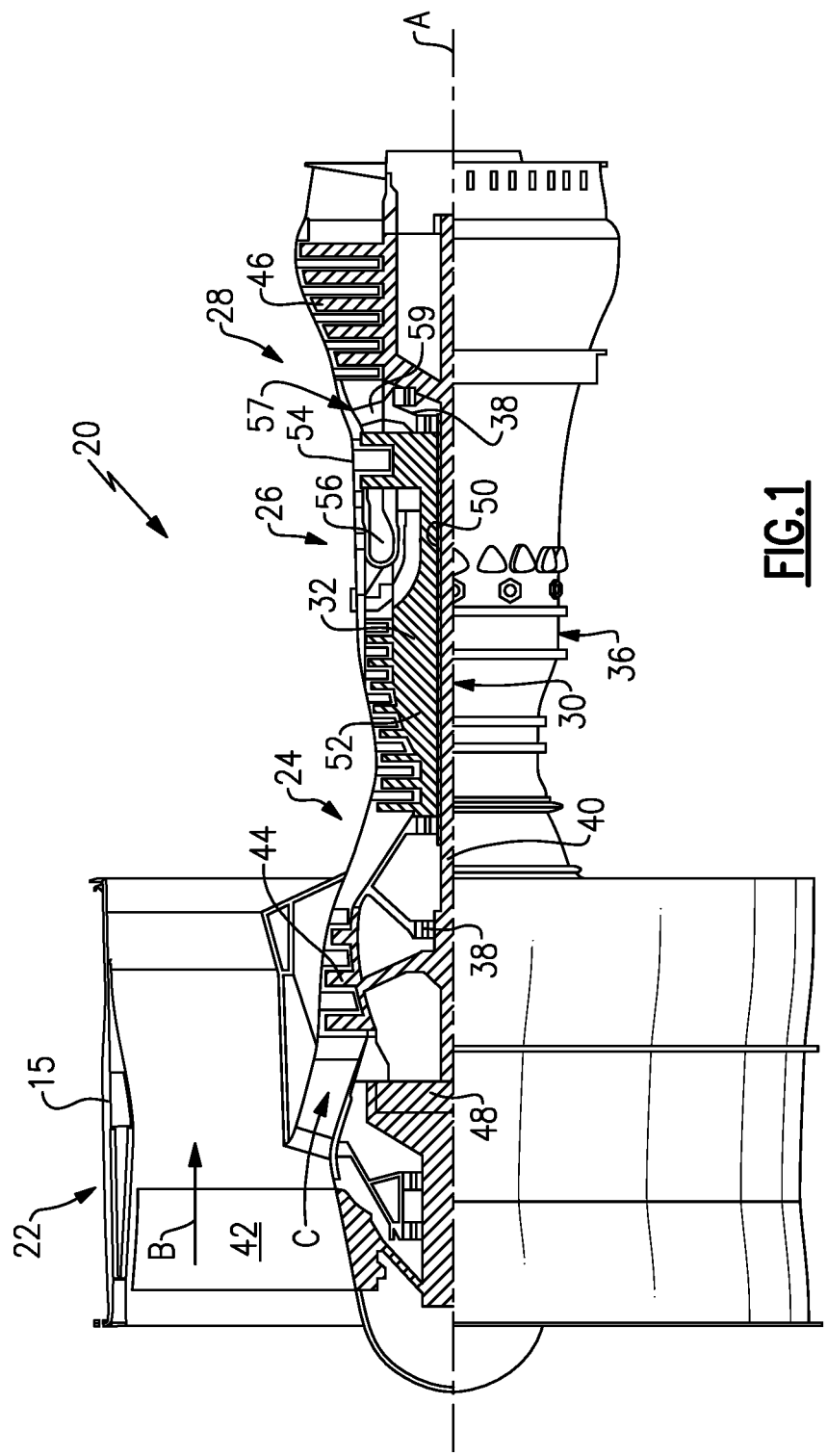
FIG. 1 illustrates a high level schematic view of an exemplary imaging system.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including single spool or three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including turbojets or direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ("TSFC")"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Existing gas turbine engines, such as the exemplary geared turbofan engine of FIG. 1, generate substantial amounts of heat that is exhausted from the turbine section 28 into a surrounding atmosphere. The exhaust heat represents wasted energy, and is a large source of inefficiency in the gas turbine engines.

Figure 2:
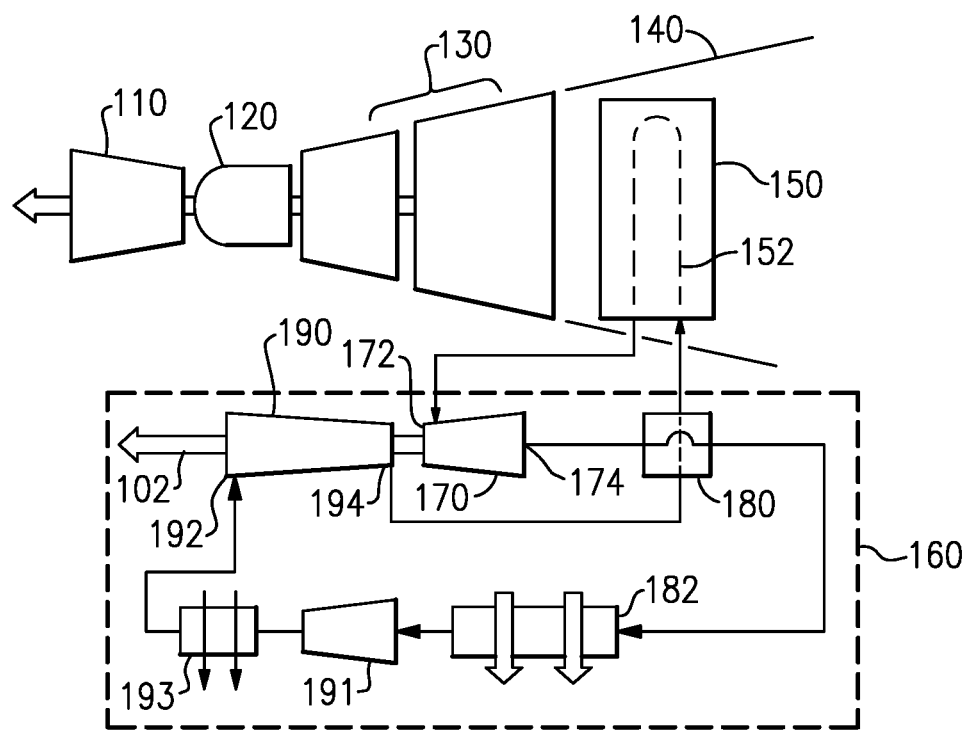
FIG. 2 schematically illustrates a gas turbine engine including an overexpanding, recuperated supercritical bottoming CO2 cycle.

With continued reference to FIG. 1, FIG. 2 schematically illustrates a gas turbine engine 100, including a compressor section 110, a combustor section 120 and a turbine section 130, all of which are connected via a primary fluid flowpath. Downstream of the turbine section 130 is an exhaust casing 140 which exhausts air from the primary fluid flowpath into an ambient atmosphere downstream of the turbine. Existing gas turbine engines expel excess heat along with the turbine exhaust into the ambient atmosphere, without using the excess heat to generate additional shaft work.

In order to recapture the waste heat within the turbine engine system of FIG. 2 and convert the waste heat to work, a heat exchanger 150 is positioned within the exhaust casing 140. In some examples the heat exchanger 150 can be a plate/fin style heat exchanger disposed on one or more internal surface of the exhaust casing 140. In alternative examples, the heat exchanger 150 can include openings and discrete fluid pathways that ingest turbine exhaust, pass the turbine exhaust through the heat exchanger 150, and then expel the turbine exhaust at a downstream edge of the heat exchanger 150. In both cases the heat exchanger 150 is referred to as having an inlet that receives the turbine exhaust and an outlet that expels the turbine exhaust.

In addition to the fluid pathway allowing turbine exhaust to pass over or through the heat exchanger 150, the heat exchanger 150 includes a second fluid pathway 152 connected to a supercritical $CO_2$ (sCO2) bottoming Brayton cycle (referred to herein as the waste heat recovery system 160). The heat exchanger 150 is configured to transfer heat from the turbine exhaust to the waste heat recovery system 160, and the waste heat recovery system 160 converts the heat into rotational work. The waste heat recovery system 160 recuperates waste heat within the recovery system 160 and expands the sCO2 working fluid below the supercritical pressure during the working cycle and is referred to as an overexpanded recuperating bottoming cycle.

Included within the waste heat recovery system 160 is a turbine 170 with an inlet 172 connected to an output of the heat exchanger 150. The turbine 170 expands the heated working fluid and expels the heated working fluid through a turbine outlet 174. The turbine 170 expands the working fluid beyond an expansion that would place the working fluid back at, or just above, the supercritical point immediately prior to the beginning of the working fluid cycle. This expansion is referred to as overexpansion. As a result of the overexpansion, a secondary compressor 191 (alternately referred to as an overexpansion compressor) and a second heat rejection heat exchanger 193 are included within the working cycle to return the working fluid (sCO2) to the pressure and temperature required to achieve the supercritical state at the beginning of the working cycle.

The expelled working fluid is passed through a relatively hot passage of a recuperating heat exchanger 180, and is passed to a relatively hot passage of a first heat rejection heat exchanger 182. After passing through the heat rejection heat exchanger 182, the working fluid is passed to the overexpansion compressor 191 and the second heat rejection heat exchanger 193. The working fluid is then passed to an inlet 192 of a compressor 190 (alternately referred to as a working fluid compressor 190). The compressor 190 compresses the working fluid, and passes the compressed working fluid from a compressor outlet 192 to a cold passage of the recuperating heat exchanger 180. In practical terms the state of the inlet 192 of the working fluid compressor is referred to as the start of the working fluid cycle.

During operation of the waste heat recovery system 160, the compressor 190 compresses the working fluid, and passes the compressed working fluid through the recuperating heat exchanger 180 and the heat exchanger 150, causing the compressed working fluid to be heated in each of the heat exchangers 150, 180. The heated working fluid is provided to the inlet 172 of the turbine 170 and expanded through the turbine 170, driving the turbine 170 to rotate. As described above, the turbine 170 overexpands the working fluid beyond a point that would return the working fluid to the state of the working fluid at the beginning of the cycle. The rotation of the turbine 170 drives rotation of the compressor 190, overexpansion compressor 191 and of an output shaft 102. The output shaft 102 is mechanically connected to one, or more, additional turbine engine systems and provides work to those systems using any conventional means for transmitting rotational work. Additionally, the rotational work can be converted into electricity and used to power one or more engine or aircraft systems. By way of example, the means for transmitting rotational work can include a drive shaft, a gear system, an electrical generator and distribution system, or any similar structure.

Figure 3:
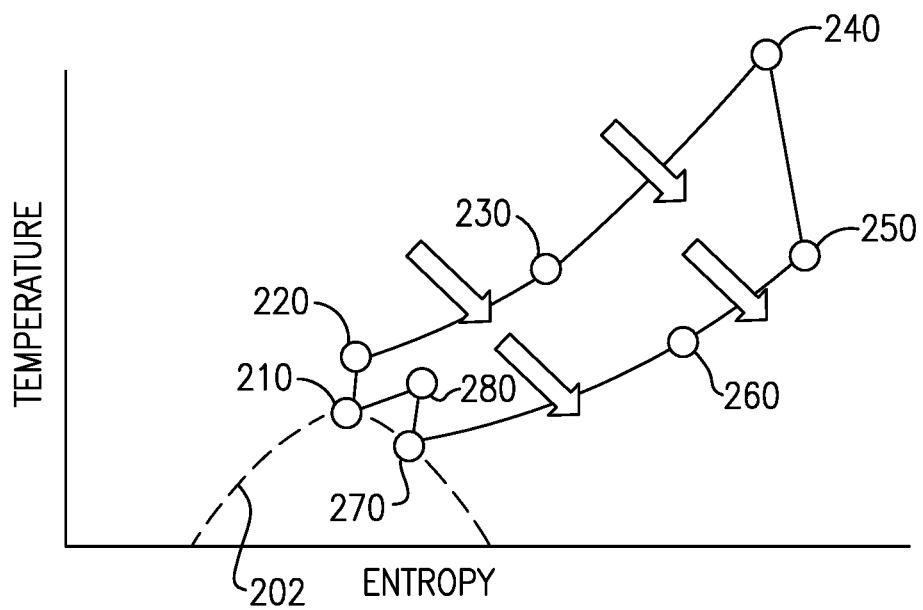
FIG. 3 illustrates a recuperating supercritical CO2 cycle diagram.

In the illustrated example, the working fluid is a $CO_2$ fluid, and is maintained at or above a supercritical point throughout the entirety of the working cycle. Due to being maintained at or above the supercritical point, the system 160 is referred to as a supercritical $CO_2$ cycle (sCO2 cycle). With continued reference to FIG. 2, FIG. 3 illustrates a chart 200 showing a state of the working fluid throughout a working cycle of the waste heat recovery system 160 as a temperature with respect to entropy. Initially, the working fluid starts at or above a peak of a vapor dome 202 at point 210. The vapor dome 202 represents an upper boundary above which the working fluid is at the corresponding supercritical point. The starting point 210 is the state of the working fluid at the inlet of the compressor 190, prior to the working fluid undergoing compression by the compressor 190.

The working fluid is compressed in the compressor 190, causing the temperature and pressure of the working fluid to increase, while also imparting a minimal increase in the entropy of the working fluid until the working fluid is expelled from the compressor 190. Point 220 of the chart 200 represents the state of the working fluid at the compressor outlet 194. After exiting the compressor 190, the working fluid is passed through the recuperating heat exchanger 180, where the temperature and entropy of the working fluid are increased until an outlet of the recuperating heat exchanger 180 illustrated at point 230.

The outlet of the recuperating heat exchanger 180 is provided to the heat exchanger 150, across which the entropy and temperature of the working fluid are again increased until a point 240. The point 240 represents the state of the working fluid at the outlet of the heat exchanger 150 and at the inlet 172 of the turbine 170, and is the peak temperature and entropy of the working fluid in the cycle. As power is extracted from the working fluid in the turbine 170, the temperature and pressure drops. The pressure is reduced below the level of the start of the cycle (point 210) and needs to be compressed back up to the pressure at point 210. The overexpansion in the turbine allows for additional work extraction compared to expanding to the pressure of the start of the cycle (point 210). After work has been extracted by the turbine 170, the overexpanded working fluid is provided to the recuperating heat exchanger 180 and a portion of the excess heat is transferred from the expanded working fluid to working fluid between points 220 and 230 of the cycle 200. The state of the working fluid at the outlet of the recuperating heat exchanger 180, and the inlet of the heat rejection heat exchanger 182 is illustrated at point 260.

In order to optimize operations of the sCO2 waste heat recovery system 160, the system 160 uses the heat rejection heat exchanger 182 to return the state of the working fluid to as close to the starting point 210 as possible. Due to the overexpansion of the turbine 170, the pressure of the working fluid at the heat rejection heat exchanger 182 outlet (point 270) is lower than required to maintain the working fluid at a supercritical point at the start of the working fluid cycle. To address this, the working fluid is pressurized in the secondary compressor 191. The pressurization results in a pressure and temperature of the working fluid at the outlet (point 280) of the secondary compressor 191 being above that which is required to maintain the supercritical state of the working fluid. A secondary heat rejection heat exchanger 193 is used to dump waste heat in a similar manner as the first heat rejection heat exchanger 182, and returns the working fluid to the inlet of the working fluid compressor 190. The waste heat can be dumped into any number of heat sinks within the gas turbine engine including, but not limited to, fan duct air, ram air, fuel, and a transcritical CO2 refrigeration cycle. The multiple stages of compression with heat rejection in between creates an intercooled compression that increases the bottoming cycle efficiency.

In the illustrated example of FIG. 3, the starting point of the cycle 200 is immediately at the vapor dome 202. In practical examples, the starting point can be targeted at slightly above the vapor dome in order to prevent minor variations during operation and other practical considerations from causing the working fluid to fall below the vapor dome 202

While described above in conjunction with a geared turbofan engine, it is appreciated that the waste heat recovery system described herein can be utilized in conjunction with any other type of turbine engine with only minor modifications that are achievable by one of skill in the art.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a primary flowpath fluidly connecting a compressor section, a combustor section, and a turbine section;
a heat exchanger disposed in the primary flowpath downstream of the turbine section, the heat exchanger including a first inlet for receiving fluid from the primary flowpath and a first outlet for expelling fluid received at the first inlet, and wherein the heat exchanger is disposed within an exhaust casing;
the heat exchanger further including a second inlet fluidly connected to a supercharged CO2 (sCO2) bottoming cycle and a second outlet connected to the sCO2 bottoming cycle; and
wherein the sCO2 bottoming cycle is an overexpanded, recuperated Brayton cycle.

2. The gas turbine engine of claim 1, wherein the sCO2 bottoming cycle comprises a turbine having a working fluid turbine inlet connected to the second outlet of the heat exchanger and a spent working fluid turbine outlet connected to an overexpansion compressor inlet of an overexpansion compressor, the overexpansion compressor having an overexpansion compressor outlet connected to a working fluid compressor inlet of a working fluid compressor, the working fluid compressor further including a working fluid compressor outlet connected to the second inlet of the heat exchanger.

3. The gas turbine engine of claim 2, further comprising a recuperator heat exchanger including a first flowpath connecting the working fluid compressor outlet to the second inlet of the heat exchanger.

4. The gas turbine engine of claim 3, wherein the recuperator heat exchanger further includes a second flowpath connecting the working fluid turbine outlet to the overexpansion compressor inlet.

5. The gas turbine engine of claim 4, further comprising a first heat rejection heat exchanger connecting an outlet of the overexpansion compressor to an inlet of the working fluid compressor.

6. The gas turbine engine of claim 4, wherein the working fluid turbine outlet is connected to the overexpansion compressor inlet via a second heat rejection heat exchanger.

7. The gas turbine engine of claim 2 wherein a fluid pressure at the working fluid compressor inlet is at least a supercritical pressure of a fluid in the working fluid bottoming cycle during standard operations, and wherein a pressure of the working fluid at the overexpansion compressor inlet is below a supercritical pressure of the working fluid at the inlet of the working fluid compressor.

8. The gas turbine engine of claim 7, wherein during standard operations, a fluid pressure and temperature at the working fluid compressor inlet is at least a supercritical pressure and temperature of the working fluid in the sCO2 bottoming cycle.

9. The gas turbine engine of claim 1, wherein the overexpanded, recuperated bottoming cycle includes a mechanical output, and wherein the mechanical output is configured to transmit rotational work from the overexpanded, recuperated bottoming cycle to at least one other engine system.

10. The gas turbine engine of claim 1, wherein the sCO2 bottoming cycle contains a CO2 fluid and the CO2 fluid is maintained at least a supercritical point throughout an entirety of the sCO2 cycle.

11. A method for recovering work from waste heat in a gas turbine engine comprising:
heating a supercritical CO2 (sCO2) working fluid in a heat exchanger using a gas turbine engine exhaust wherein the heat exchanger is disposed within an exhaust casing of a gas turbine engine and is disposed in the primary flowpath of a gas turbine engine and is aft of a turbine section of the gas turbine engine;
providing the heated sCO2 working fluid to a waste recovery turbine;
expanding the heated sCO2 working fluid across the waste recovery turbine, thereby driving the waste recovery turbine to rotate;
providing sCO2 working fluid from an outlet of the waste recovery turbine to an inlet of an overexpansion compressor and compressing the sCO2 working fluid;
providing the sCO2 working fluid from an outlet of the overexpansion compressor to an inlet of a work recovery compressor through a first heat rejection heat exchanger;
providing the compressed sCO2 working fluid to an inlet of the waste recovery turbine from the work recovery compressor; and
maintaining the sCO2 working fluid above a supercritical point through an entirety of a working cycle.

12. The method of claim 11, further comprising passing the sCO2 working fluid from the outlet of the waste recovery turbine through a recuperator heat exchanger, and passing an sCO2 working fluid from the work recovery compressor through the recuperator heat exchanger prior to providing the sCO2 working fluid from the work recovery compressor to the heat exchanger thereby transferring heat from the sCO2 working fluid exiting the turbine to the sCO2 working fluid entering the heat exchanger.

13. The method of claim 11, wherein providing sCO2 working fluid from the outlet of the waste recovery turbine to the inlet of the overexpansion compressor comprises passing the sCO2 working fluid through a second heat rejection heat exchanger, thereby dumping waste heat to a heat sink.

14. The method of claim 13, wherein the heat sink is at least one of fan duct air, ram air, fuel, and a transcritical CO2 refrigeration cycle.

15. The method of claim 13, wherein providing sCO2 working fluid from the outlet of the waste recovery turbine to the inlet of the overexpansion compressor comprises reducing a temperature and pressure of the sCO2 working fluid to below a minimum supercritical temperature and pressure of the working fluid at the work recovery compressor inlet.

16. The method of claim 11, wherein expanding the heated sCO2 working fluid across the waste recovery turbine, thereby driving the waste recovery turbine to rotate further comprises transmitting rotational work from the waste recovery turbine to at least one engine system in the gas turbine engine.

17. The method of claim 11, wherein compressing the sCO2 working fluid comprises driving rotation of the work recovery compressor via the waste recover turbine.

18. A gas turbine engine comprising:
a primary flowpath fluidly connecting a compressor section, a combustor section, and a turbine section;
a heat exchanger disposed on at least one internal surface of an exhaust casing and in the primary flowpath downstream of the turbine section, the heat exchanger including a first inlet for receiving fluid from the primary flowpath and a first outlet for expelling fluid received at the first inlet;
the heat exchanger further including a second inlet fluidly connected to a supercharged CO2 (sCO2) bottoming cycle and a second outlet connected to the sCO2 bottoming cycle;
wherein the sCO2 bottoming cycle is an overexpanded, recuperated Brayton cycle; and
a means for transmitting rotational work from the overexpanded recuperated bottoming cycle to at least one other engine system.

19. The gas turbine engine of claim 18, wherein the means for transmitting rotational work includes a mechanical output connected to at least one of a drive shaft, a gear system, and an electrical generator and distribution system.

20. The gas turbine engine of claim 1, wherein the heat exchanger is positioned on at least one internal surface of the exhaust casing.

21. The gas turbine engine of claim 1, wherein the heat exchanger is a plate/fin heat exchanger.

22. The method of claim 11, wherein the heat exchanger is disposed on at least one internal surface of the exhaust casing.

* * * * *